Aug. 17, 1965  J. F. MEYER ETAL  3,201,276
INSULATED CONDUCTOR HAVING UNDERCOAT OF ISOCYANURATE
MODIFIED POLYESTER AND OVER-COAT OF POLYETHYLENE
TEREPHTHALATE
Filed Aug. 16, 1961
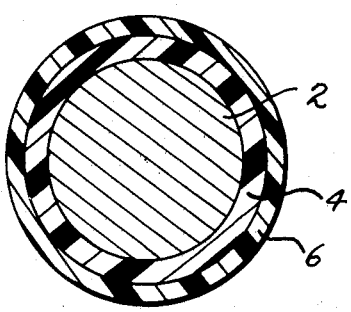
INVENTORS
JOHN F. MEYER
EDMUND J. ZALEWSKI
BY Cushman, Darby & Cushman
ATTORNEYS United States Patent Office 3,201,276
Patented Aug. 17, 1965

3,201,276
INSULATED CONDUCTOR HAVING UNDERCOAT OF ISOCYANURATE MODIFIED POLYESTER AND OVERCOAT OF POLYETHYLENE TEREPHTHALATE
John F. Meyer and Edmund J. Zalewski, Schenectady, N.Y., assignors to Schenectady Varnish Company, Inc., Schenectady, N.Y., a corporation of New York
Filed Aug. 16, 1961, Ser. No. 131,736
10 Claims. (Cl. 117—218)

This invention relates to insulated electrical conductors. More particularly, this invention relates to improved polyester coatings for such conductors.

It is known to prepare wire enamels including products attained by reacting an aromatic dicarboxylic acid, e.g., terephthalic acid or isophthalic acid, or ester-forming derivatives thereof (including half-esters) such as the lower alkyl esters, e.g., those formed from methyl, ethyl, propyl, butyl, amyl, hexyl or heptyl alcohols or from phenol or its homologues with a glycol, including ethylene glycol, trimethylene glycol, tetramethylene glycol, pentamethylene glycol, hexamethylene glycol and even higher glycols, or ester-forming derivatives thereof, e.g., esters with low molecular weight carboxylic acids.

In copending application Serial No. 58,198, filed September 26, 1960, and now Patent No. 3,141,859 and entitled Wire Coating and Coated Electrical Conductor, it is proposed to coat an electrical conductor from a dispersion of a linear polyester as described above, e.g., polyethylene terephthalate, in a solvent comprising a chlorophenol, e.g., o-chlorophenol, m-chlorophenol and p-chlorophenol; an alkylated chlorophenol, such as p-chloro-m-cresol, 4 chloro-sec butyl phenol and p-chlorothymol; or a mixture of these chlorophenols; a cresol, e.g., o-cresol, m-cresol, p-cresol, cresylic acid and a mixture of m-cresol and p-cresol; and phenol. For all or a portion of the phenol can be substituted one of the cresols or a mixture thereof.

Among the preferred solvent compositions are those containing one each of the groups of chlorophenols and cresols together with phenol, e.g., p-chlorophenol, o-cresol and phenol. Another preferred solvent mix comprises p-chlorophenol and cresylic acid, while a third preferred mix contains p-chlorophenol and m-p-cresol. The preferred chlorophenol is p-chlorophenol and the preferred cresol is o-cresol.

As previously stated, the solvent employed may include cresylic acid. Generally, the cresylic acid has a boiling range of 189° to 220° C. Cresylic acid is defined in Bennett's Concise Chemical and Technical Dictionary (1947), as a mixture of o-, m-, and p-cresols having a boiling range of 185° C. to 230° C.

As also previously stated, in place of all or a portion of the phenol, the individual cresols, e.g., o-, m-, or p-cresol, or a mixture thereof, e.g., m-p-cresol or cresylic acid, can be employed, but it is preferred to include phenol in the solvent mix. When dissolving a polyester in the preferred solvent mixture the chlorophenol may be employed in the range of 30 to 50%, based on the weight of the total solvent, the phenol in the range of 25 to 50% and the cresol in the range of 10 to 35%. If, as stated previously, a cresol is substituted for the phenol, the total cresol may be employed up to 70%.

It has also been found that with the use of the above solvent mixtures, solutions of the polymeric linear esters can be prepared which contain up to 21% solids content, and which remain stable for increased periods of time. The preferred range of solids content is between about 13% and 18% for solutions to be used for applying wire enamel, a solution containing a solids content of about 15% remaining stable for a year or more.

Formation of these polyesters is set forth in the aforementioned copending application, and said application is incorporated herein in its entirety.

It has been found desirable that enamel coated wire pass certain tests in order to be suitable for use at elevated temperatures for extended periods of time. The enameled wire prepared from the compositions was tested and displayed distinctly superior qualities as shown by the following results:

(a) Dielectric strength (A.S.T.M. test D–149, short time) of wire coated with the product of this invention—2,600 volts per mil; whereas wire coated with polyamid type enamels shows at the same test only about 1200–1400 volts per mil dielectric strength.

(b) Scrape abrasion test (NEMA Magnet Wire Standards MW 24–25, edition November 1946) 25–35 strokes with a 700 gm. weight; whereas polyamid type enamel coated wire under the same conditions will pass only 15–20 strokes.

(c) Heat aging test (NEMA Standards MW 24–40). The coated wire will pass winding around its 3 times diameter without cracking or crazing after 45 days aging at 125° C. (NEMA Standards requirement 8 days); whereas polyamid type enamel coated wire under the same conditions will fail on the same 3 times diameter winding after 7 days aging at 125° C.

Similarly, in our copending application Serial No. 117,499, filed June 16, 1961, and entitled A Reaction Product of a Dibasic Polycarboxylic Acid and Tris (2-hydroxyethyl) Isocyanurate, there are disclosed improved polyester coatings for electrical conductors comprising the reaction product of tris (2-hydroxyethyl) isocyanurate with terephthalic acid or isophthalic acid or an ester forming derivative of such acids.

The tris (2-hydroxyethyl) isocyanurate can be employed as the sole polyhydric alcohol or it can be replaced in part by one or more other polyhydric alcohols. While as little as 10% of the total polyhydric alcohol can be the tris (2-hydroxyethyl) isocyanurate, preferably at least 50% of the total polyhydric alcohol is the isocyanurate on a weight basis.

On an equivalent percent basis preferably at least 25% of the total polyhydric alcohol is the tris (2-hydroxyethyl) isocyanurate.

In making the polyester usually 15 to 46 equivalent percent is the carboxylic acid reactant and the balance is the polyhydric alcohol; i.e., there should be an excess of alcoholic groups over acid groups.

All of the polycarboxylic acid constituent can be the terephthalic acid or isophthalic acid or a portion up to 80 equivalent percent based on a total of 100 equivalent percent of the acid constituent can be a different acid.

Preferably at least 50 equivalent percent of the acid component is terephthalic acid. The term equivalent percent is conventionally employed in the art since the alcohol and acid components react on an equivalent rather than a molar basis. The term equivalent percent is defined for example in Sheffer Patent No. 2,889,304 and Precopio Patent No. 2,936,296.

To improve abrasion properties of the wire enamel small amounts of metal driers are employed.

While the new polyesters are preferably employed in making wire enamels they are also useful in making molded products and in solution can be used to impregnate cloth, paper, asbestos and the like. They can be employed in general whereever alkyl resins are useful.

The total number of hydroxyl groups on the alcohols normally is 1 to 1.6 times the total number of carboxyl groups on the acids.

It has further been found that the properties of the polyester can be improved by the addition of a polyisocyanate in an amount of 10–40%, preferably 15 to 25% by weight of the total of the polyisocyanate and polyester. Preferably, the polyisocyanate has at least three available isocyanate groups.

While the polyisocyanates can be used as such, particularly where pot life is not important, it is preferred to block the isocyanate groupings, e.g., by forming carbamates, with a group that will split off at the reaction temperature employed with the polymeric terephthalic or isophthalic ester, e.g., monohydric phenols, the xylenols, monohydric alcohols, hydroxyalkylcarbamic acid aryl esters, mercaptans, lactams, imides, secondary amines, etc.

As specific examples of such blocked polyisocyanates, there may be mentioned Mondur S, wherein the isocyanate groups of the reaction product of 3 mols of mixed 2,4- and 2,6-tolylene diisocyanate with trimethylol propane are blocked by esterification with m-cresol. At present Mondur SH is the preferred polyisocyanate.

Unless otherwise stated hereinafter in the specification and claims, it is understood that whenever the term "polyisocyanate" is employed, it is intended to include both the free isocyanates and the blocked isocyanates.

The polyisocyanate is mixed with the preformed polyester either dry or dissolved in a solvent prior to mixing. The reaction between the polyester and the polyisocyanate is hastened by using elevated temperatures and in preparing wire enamels they are usually reacted at a temperature of about 650 to 800° F.

The metal drier is preferably used in an amount of 0.2 to 1.0% metal based on the total solids in the enamel. Typical metal driers include the zinc, lead, calcium or cadmium linoleates, octoates, and resinates of each of these metals, e.g., zinc resinate, cadmium resinate, lead linoleate, calcium linoleate, zinc naphthenate, lead naphthenate, calcium naphthenate, cadmium naphthenate, zinc octoate and cadmium octoate. Other suitable metal drier, specifically polyvalent metal driers such as manganese naphthenate and cobalt naphthenate can be employed.

It has further been found that the properties of the polyester wire enamel can be improved by incorporating a tetra alkyl titanate in place of the metal drier and polyisocyanate. Typical tetra alkyl titanates are tetraisopropyl titanate, tetrabutyl titanate, tetrahexyl titanate, tetramethyl titanate and tetrapropyl titanate. The titanate is used in small amounts, e.g., 0.001 to 4.0% titanium metal on the total solids of the enamel.

Preparation of these polyesters is described in aforementioned application Serial No. 117,499, and said application is incorporated herein in its entirety.

While enamels incorporating esters of tris (2-hydroxyethyl) isocyanurate exhibit exceptionally good resistance to heat aging, the abrasion resistance and heat shock characteristics are satisfactory but not outstanding.

It is therefore an object of this invention to provide improved coatings for electrical conductors.

It is another object of this invention to provide coatings for electrical conductors which exhibit exceptionally good abrasion resistance and heat shock characteristics.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that the foregoing objects can be attained by applying a wire enamel comprising a polymeric ester of a polycarboxylic acid of the group consisting of terephthalic acid and isophthalic acid and tris (2-hydroxyethyl) isocyanurate, and by applying an overcoat of a linear polyester formed by the reaction of an aromatic dicarboxylic acid and a glycol, e.g., polyethylene terephthalate.

The invention will be understood best in connection with the drawing wherein the single figure shows a wire coated in accordance with the invention.

Referring more specifically to the drawing, there is provided a copper wire 2 having a first coating 4 of a polymeric ester of terephthalic acid and tris (2-hydroxyethyl) isocyanurate and a second coating 6 of polyethylene terephthalate.

The specific properties which show marked improvement are abrasion resistance and heat shock characteristics. Generally, abrasion resistance is improved by from 50 to 100% and heat shock characteristics improved such that it is possible to prestretch the conductor up to 13.5% and still have it pass at least the same heat shock test as a conductor not containing the overcoat will pass without any stretch.

The heat shock test measures the effect of high temperatures on the flexibility of a wire enamel. It is measured by winding a sample of the enameled wire having a conductor diameter X on a conical mandrel having an apex angle of about 20 degrees, removing the conical sample of wire from the mandrel and placing it in a circulating air oven maintained at 175° C. After 10 minutes the conical sample of wire should show no surface defects in any of the windings formed on a portion of the cone having a diameter greater than 5X in order for the enameled wire to have sufficient flexibility for steady operation at at least 135° C.

Abrasion resistance is a measure of the amount of abrasion an insulated electrical conductor will withstand before the insulating enamel is wound away from the conductor. Abrasion resistance is measured by rubbing a 700 gram weight back and forth across the surface of the insulated electrical conductor until the enamel is worn away. The number of strokes required to wear the enamel away is referred to as the number of abrasion resistance strokes (NEMA Magnetic Wire Standards MW 24, 25, ed. November, 1946).

The polyester compositions are dispersed in solvents and are applied to wire, e.g., copper wire or other metallic wire, by either of two methods conventionally employed in the wire enameling art. For example, it can be run by the "free dip" method. In this method, the polyester solution at its original strength is kept at room temperature in a tub, and the wire passes in a vertical direction through the tub, picking up enamel as it passes therethrough. Alternatively, the polyester solution can be used at original strength as a die application wire enamel. In this method also, the resin solution is placed in a tub at room temperature. The wire passes through the tub picking up enamel and is then squeezed in its vertical movement through dies which allow only a certain amount of coating to remain on the wire, the excess being stripped off by the narrow crevice of the die.

The wire coated in either of these processes is then baked in a wire enameling tower at conventional temperatures above the boiling point of the solvent mixture, e.g., 250° to 800° F., to complete the polymerization of the resin and to remove the solvent. Wire speeds of 15 to 30 feet/min., and preferably of 23 to 27 feet/min., can be employed. The entering temperature of the tower is about 250° F., increasing through the length to about 650° F. to 750° F. at the point of exit. The elevated temperature causes the solvent to be driven off, and as the wire travels into the higher temperature region, the polyester composition fuses onto the wire. Additional coats if necessary are applied by subsequent passing and baking until the desired build (i.e. the total increase in diameter over the bare wire diameter) of between about 0.002 and about 0.004 inch is acquired, a coating between about 0.003 and 0.0033 inch being preferred.

In the present invention the undercoat of the tris (2-hydroxyethyl) isocyanurate polyester is built up to a build between .002″ and .010″, preferably between .002″ and .003″ on #18 wire. The overcoat of the polyester of an aromatic dicarboxylic acid and a glycol is built up to a build between .001″ and .003″ and preferably between .001″ and .002″, making an overall build of the coating between .003″ and .013 and preferably between .003″ and .006″.

In the following examples and throughout the specification and claims, all parts are parts by weight unless otherwise specified.

EXAMPLE 1

| | |
|---|---|
| Tris (2-hydroxyethyl) isocyanurate | 1044 grams (4 moles). |
| Dimethyl terephthalate | 776 grams (4 moles). |
| Xylol | 100 ml. |
| Solvesso 100 | 200 ml. |
| Tetraisopropyl titanate | 3.6 grams. |

The above mixture was charged into a 3 liter reaction kettle equipped with a distillation condenser, stirrer and thermometer. The temperature was raised slowly over the course of 6 hours until 365° F. was reached. At this time the batch was reduced with cresylic acids to a solids content of 73.9%. To 1000 grams of the above grams of Solvesso, 100 and 29.5 grams of tetraisopropyl titanate. The resulting enamel had a viscosity of H-I Gardner-Holdt scale) and a solids content of approximately 30%.

EXAMPLE 2

| | Grams |
|---|---|
| Polyethylene terephthalate | 170 |
| p-Chlorophenol | 332 |
| o-Cresol | 166 |
| Phenol | 332 |

The mixture was heated to a temperature of about 220° F. The ester was completely and homogeneously dispersed, the liquid composition having a viscosity of X to Y, 17% solids content and a specific gravity of 1.160.

EXAMPLE 3

To illustrate the improvement in abrasion resistance and heat shock characteristics of the coating of the present invention, a #18 copper wire was coated with enamel prepared according to Example 1 by the die application procedure. A coated wire was thereafter passed through a commercial wire enamel tower at a wire speed of 22.5 ft. per minute at an entering temperature of 500° F. and an exit temperature of 800° F. Six passes of the wire through the solution and tower were employed and the total build up of enamel on the wire was about .003″. A second conductor was similarly coated except that only 5 passes of the wire through the solution and tower were employed. The conductor was then given an overcoat by a single pass through the solution prepared according to Example 2.

EXAMPLE 4

Two conductors were coated as described in Example 3 at a wire speed of 25.25 feet per minute.

The comparative properties of the conductors coated according to Examples 3 and 4 are given in the following table:

*Table 1*

| Enamel | Abrasion Resistance (Strokes) | Heat Shock [1] at 175° C. | | | | | |
|---|---|---|---|---|---|---|---|
| | | No Pre-stretch—Mandrel | | | 13.5% Pre-stretch—Mandrel | | |
| | | 1× | 2× | 3× | 1× | 2× | 3× |
| Example 3 (22.5 ft./min.): | | | | | | | |
| (a) 6 coats enamel of Example 1 | 33 | 30 | 80 | 100 | | | |
| (b) 5 coats enamel of Example 1, 1 coat enamel of Example 2 | 54 | | | | 100 | 100 | 100 |
| Example 4 (25.5 ft./min.): | | | | | | | |
| (a) 6 coats enamel of Example 1 | 20 | 0 | 10 | 100 | | | |
| (b) 5 coats enamel of Example 1, 1 coat enamel of Example 2 | 36 | | | | 50 | 100 | 100 |

[1] Figures are percent of test specimens which pass the indicated mandrel.

What is claimed is:

1. An electrical conductor provided with a first continuous coating comprising a polymeric ester of a polycarboxylic acid selected from the group consisting of terephthalic acid and isophthalic acid and tris (2-hydroxyethyl) isocyanurate, and a second continuous coating of polyethylene terephthalate.

2. A conductor according to claim 1 wherein said polycarboxylic acid is terephthalic acid.

3. A conductor according to claim 2 wherein a portion of the terephthalic acid up to 50 equivalent percent of the total acid is replaced by another polycarboxylic acid.

4. A conductor according to claim 1 wherein a portion of the tris (2-hydroxyethyl) isocyanurate up to 50 equivalent percent of the total polyhydric alcohol is replaced by another polyhydric alcohol.

5. A conductor according to claim 1 wherein the first polymeric ester consists of the reaction product of terephthalic acid and tris (2-hydroxyethyl) isocyanurate.

6. A conductor as in claim 1 wherein the first of said coatings comprises the reaction product of the polymeric ester with a polyisocyanate.

7. A conductor as in claim 1 wherein the first of said coatings comprises the reaction product of the polymeric ester with an alkyl titanate.

8. An electrical conductor as in claim 1 wherein the total number of hydroxyl groups on the alcohol reactant for the first of said coatings is from 1 to 1.6 times the total number of carboxyl groups of the acid reactant.

9. A method for preparing a coated electrical conductor which comprises providing a conductor with a first continuous coating comprising a polymeric ester of a polycarboxylic acid selected from the group consisting of terephthalic acid and isophthalic acid and tris (2-hydroxyethyl) isocyanurate, and a second continuous coating of polyethylene terephthalate, said second continuous coating being deposited from a solution in a solvent consisting essentially of monochlorophenol and a member selected from the group consisting of a cresol and mixtures of a cresol with phenol, said monochlorophenol being 30 to 50% of the weight of the total solvent.

10. A method according to claim 9 wherein the solvent is a mixture of monochlorophenol, phenol and chesol.

References Cited by the Examiner

UNITED STATES PATENTS

| | | | |
|---|---|---|---|
| 2,889,304 | 6/59 | Sheffer et al. | 117—232 X |
| 2,894,934 | 7/59 | Burhard | 260—33.4 |
| 2,905,657 | 9/59 | Huffman | 260—33.4 |
| 2,917,414 | 12/59 | McLean | 117—232 X |
| 2,924,500 | 2/60 | Huffman | 260—33.4 |
| 2,936,296 | 5/60 | Precopio | 260—33.4 |
| 2,982,754 | 5/61 | Sheffer et al. | 117—232 X |
| 3,022,200 | 2/62 | Koener et al. | 117—218 |
| 3,047,515 | 7/62 | Piirma | 260—429.5 X |
| 3,056,818 | 10/62 | Werber | 260—75 |

OTHER REFERENCES

Dudley et al.: Journal of the American Chemical Society, vol. 73, p. 2999, (1951).

Frazier et al.: Journal of Organic Chemistry, vol. 25, pp. 1944–1946 (1960).

RICHARD D. NEVIUS, *Primary Examiner.*